United States Patent
Hamada et al.

(10) Patent No.: US 6,353,452 B1
(45) Date of Patent: Mar. 5, 2002

(54) DATA ITEM DISPLAY METHOD AND DEVICE, AND RECORDING MEDIUM STORING A PROGRAM FOR CONTROLLING DISPLAY OF DATA ITEM

(75) Inventors: Seiji Hamada, Sagamihara; Robert Logie, Tokyo; Takashi Ogura, Hachiohji, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/175,511

(22) Filed: Oct. 20, 1998

(30) Foreign Application Priority Data

Oct. 20, 1997 (JP) .............................................. 9-286637

(51) Int. Cl.[7] .......................... G09G 5/00; G06F 17/30
(52) U.S. Cl. ...................... 345/825; 345/968; 345/780; 345/826; 345/812; 345/813; 345/824; 707/4
(58) Field of Search ................................. 345/145, 160, 345/348, 349, 354, 352, 968, 967, 780, 825, 826, 812, 813, 822, 824; 707/347, 4

(56) References Cited

U.S. PATENT DOCUMENTS

| | | | | |
|---|---|---|---|---|
| 5,371,851 A | * | 12/1994 | Pieper et al. | 364/518 |
| 5,826,263 A | * | 10/1998 | Nakabayashi et al. | 707/7 |
| 5,890,014 A | * | 3/1999 | Long | 711/170 |
| 6,005,578 A | * | 12/1999 | Cole | 345/352 |
| 6,047,844 A | * | 5/2000 | Strauss | 345/358 |
| 6,091,416 A | * | 7/2000 | Cragun | 345/358 |
| 6,008,449 A | * | 9/2000 | Rosen et al. | 345/339 |
| 6,151,023 A | * | 11/2000 | Chari | 345/349 |

* cited by examiner

Primary Examiner—Raymond J. Bayerl
Assistant Examiner—Thomas J Joseph
(74) Attorney, Agent, or Firm—Ronald L. Drumheller

(57) ABSTRACT

In order to make sure that a user does not attempt to build an invalid database query in which tables are incorrectly joined on fields that cannot be joined due to an incompatibility of data types, after the user selects a source data field the incompatible target data fields which cannot be joined with the selected source data field are determined automatically and displayed distinctly differently in a target list box of possible target data field names, such as in a different color.

3 Claims, 16 Drawing Sheets

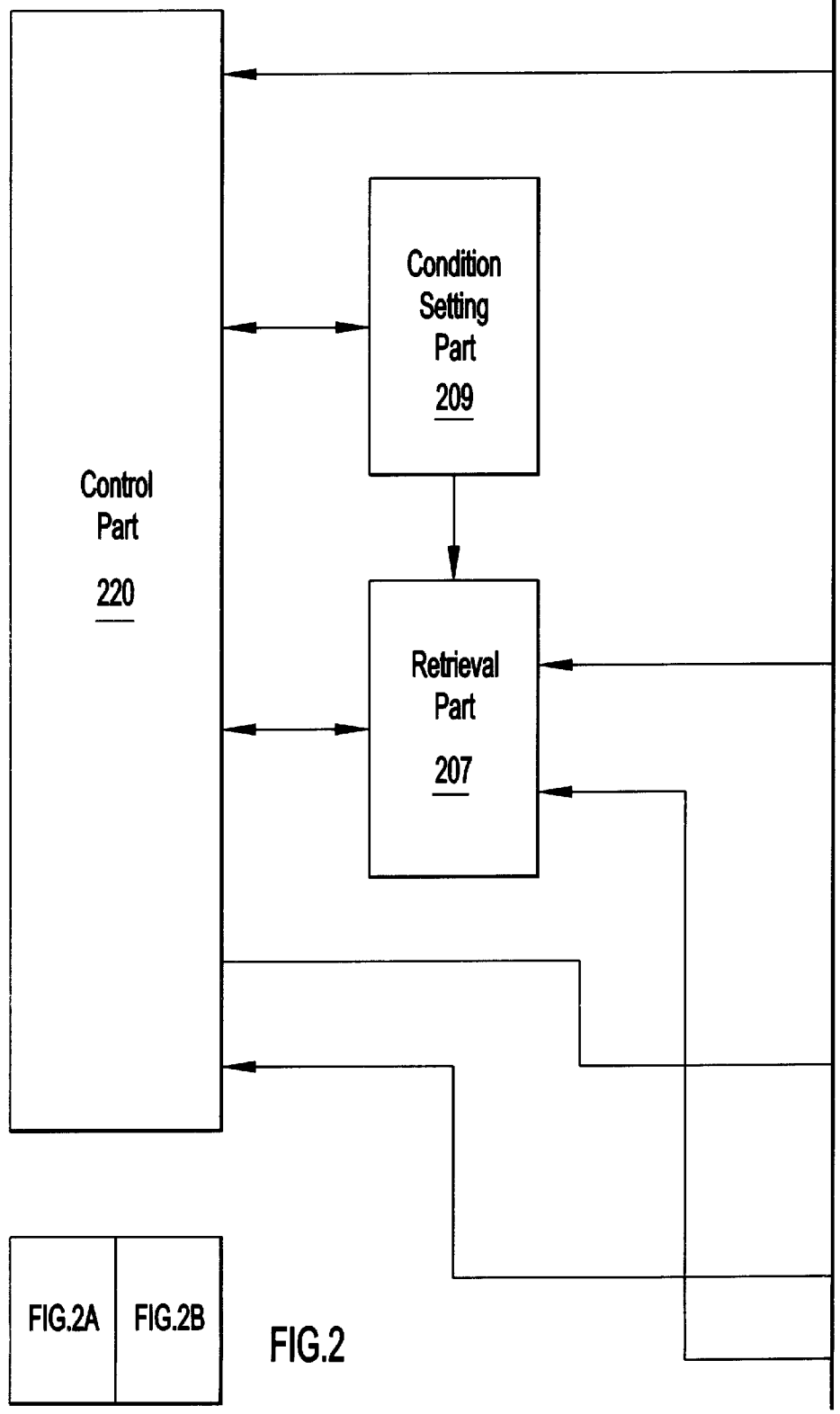

DATA ITEM DISPLAY METHOD AND DEVICE, AND RECORDING MEDIUM STORING A PROGRAM FOR CONTROLLING DISPLAY OF DATA ITEM

BACKGROUND OF THE INVENTION

1. Field of the Invention

This invention relates to a method of retrieving a database and, more particularly, to a method of preparing a database query statement.

2. Related Art

A function of assembling a database query statement of a SQL (Structured Query Language), etc., of an RDB (Relational DataBase) utilizing a GUI (Graphical User Interface) is generally called a query builder and is implemented in many stand alone products and other products such as "MS Access 97" (Access is a trademark of Microsoft) and "Lotus Approach97" (Approach is a trademark of Lotus).

Each of such products is so designed as to allow visual selection of a field and description of conditions by using a GUI as shown in FIG. 15 and FIG. 16. However, in order to prepare an SQL statement by joining a plurality of tables in these products, the only method available in the technology employed in these products is simply to display field name and join them. Thus, the user had to perform a joining operation by taking care of the data type of each field. Accordingly, there was a problem in that the user had to learn the data type of each field or repeat trail and error steps in performing the joining operation and was unable to work efficiently.

Especially, selection of the data type is not simple and there is a case where joining is permitted even if the data types are not necessarily of a same type. For example, joining of Float type and Date type is not permitted while joining of Float type and Real type is permitted.

A specific example of a typical query builder is described hereunder.

FIG. 15 is a chart showing the GUI of Microsoft Access97. The GUI shown in FIG. 15 is in a state in which a field of a first table (source table) 500 is selected and the mouse cursor is on a field of a second table (target table) 510 with the left button held depressed when two tables are to be joined. The user has to decide an item to be joined from the field name and affirm the attribute of a table by opening it when it is desired to know the data type. If the user fails to do this correctly, the SQL statement would cause an error upon execution so that an application could not be developed efficiently.

FIG. 16 is a chart showing the GUI of Lotus Approach97. The GUI shown FIG. 16 is also in a state in which a field of a first table (source table) 500 is selected and the mouse cursor is on a field of a second table (target table) 510 with the left button held depressed when two tables are to be joined. While the data type of the position where the mouse cursor is currently placed is given in the lower right field, it is impossible to visually determine which data type can be joined with the data type of the first table so that an SQL statement could not be prepared efficiently.

SUMMARY OF THE INVENTION

It is an object of this invention to allow a database query statement involving a joining of a plurality of tables to be prepared visually and efficiently without an error.

When the user selects a data item of the source data field and drags the mouse cursor to a list box of the target table, a field of the target table which can not be joined with the data type of the field of the initially selected source table is displayed in the display distinctively from a field with which it can be joined.

In one aspect of this invention, a method is provided for displaying a data item executed on a data item display device which comprises a display and a pointing device and acquires from a data source information of a source database table including a plurality of source data fields each having attribute information and a target database table including a plurality of target data fields each having attribute information to display in said display at least a portion of said plurality of source data fields and said plurality of target data fields as a plurality of source data items and a plurality of target data items, said method comprising the steps of:

(a) displaying a source list box including a plurality of source data items and a target list box including a plurality of target data items in said display;

(b) detecting that one of said source data items is dragged by said pointing device;

(c) determining whether or not the pointer of said dragged pointing device is on said target list box;

(d) determining whether or not the attribute information of the target data field corresponding to at least a part of said plurality of target data items matches a predetermined condition with respect to the attribute information of the source data field corresponding to said dragged source data item when the pointer is on said target list box; and (e) displaying a target data item corresponding to the attribute information of the target data field which is determined not to match said predetermined condition distinctively from a target data item corresponding to the attribute information of the target data field which is determined to match said predetermined condition.

Incidentally, the term "attribute information" as used in the claims of this specification is a concept including not only the data type to be described in the preferred embodiment of this invention but also various attribute information correlated to the fields.

Also, the term "distinctively display" as used in the claims of this specification is a concept including modification of various display attributes and display contents such as modification of color, brightness and font, and display with blinking, inversion display, underscoring and shading.

In another aspect of this invention, a method is provided for displaying a data item executed on a data item display device which comprises a display and a pointing device and acquires from a data source information of a source database table including a plurality of source data fields each having attribute information and a target database table including a plurality of target data fields each having attribute information to display in said display at least a portion of said plurality of source data fields and said plurality of target data fields as a plurality of source data items and a plurality of target data items, said method comprising the steps of:

(a) displaying a source list box including a plurality of source data items and a target list box including a plurality of target data items in said display;

(b) detecting that one of said source data items is specified by an operator;

(c) determining whether or not the attribute information of the target data field corresponding to at least a part of said plurality of target data items matches a predetermined condition with respect to the attribute information of the source data field corresponding to said specified source data item; and (d) displaying a target data item corresponding to the attribute information of the target data field which is determined not to match said predetermined condition distinctively from a target data item corresponding to the attribute information of the target data field which is determined to match said predetermined condition.

In another aspect of this invention, a data item display device is provided for displaying a data item executed on a data item display device which comprises a display and a pointing device and acquires from a data source information of a source database table including a plurality of source data fields each having attribute information and a target database table including a plurality of target data fields each having attribute information to display in said display at least a portion of said plurality of source data fields and said plurality of target data fields as a plurality of source data items and a plurality of target data items, said data item display device comprising:

(a) a display for displaying a source list box including a plurality of source data items and a target list box including a plurality of target data items in said display;

(b) a target list box control part instructing to;

(b-1) determine whether or not the attribute information of the target data field corresponding to at least a part of said plurality of target data items matches a predetermined condition with respect to the attribute information of the source data field corresponding to one source data item specified by an operator among said plurality of source data items; and (b-2) display a target data item corresponding to the attribute information of the target data field which is determined not to match said predetermined condition distinctively from a target data item corresponding to the attribute information of the target data field which is determined to match said predetermined condition.

In another aspect of this invention, a recording medium storing an image processing program is provided for controlling display of a data item executed on a data item display device which comprises a display and a pointing device and acquires from a data source information of a source database table including a plurality of source data fields each having attribute information and a target database table including a plurality of target data fields each having attribute information to display in said display at least a portion of said plurality of source data fields and said plurality of target data fields as a plurality of source data items and a plurality of target data items, said image processing program comprising:

(a) a program code to instruct said data item display device to display a source list box including a plurality of source data items and a target list box including a plurality of target data items in said display;

(b) a program code to instruct said data item display device to detect that one of said source data items is dragged by said pointing device;

(c) determining whether or not the pointer of said dragged pointing device is on said target list box;

(d) a program code to instruct said data item display device to determine whether or not the attribute information of the target data field corresponding to at least a part of said plurality of target data items matches a predetermined condition with respect to the attribute information of the source data field corresponding to said dragged source data item when the pointer is on said target list box; and (e) a program code to instruct said data item display device to display a target data item corresponding to the attribute information of the target data field which is determined not to match said predetermined condition distinctively from a target data item corresponding to the attribute information of the target data field which is determined to match said predetermined condition.

In another aspect of this invention, a recording medium storing an image processing program is provided for controlling display of a data item executed on a data item display device which comprises a display and a pointing device and acquires from a data source information of a source database table including a plurality of source data fields each having attribute information and a target database table including a plurality of target data fields each having attribute information to display in said display at least a portion of said plurality of source data fields and said plurality of target data fields as a plurality of source data items and a plurality of target data items, said image processing program comprising:

(a) a program code to instruct said data item display device to display a source list box including a plurality of source data items and a target list box including a plurality of target data items in said display;

(b) a program code to instruct said data item display device to detect that one of said source data items is specified by an operator;

(c) a program code to instruct said data item display device to determine whether or not the attribute information of the target data field corresponding to at least a part of said plurality of target data items matches a predetermined condition with respect to the attribute information of the source data field corresponding to said specified source data item; and (d) a program code to instruct said data item display device to display a target data item corresponding to the attribute information of the target data field which is determined not to match said predetermined condition distinctively from a target data item corresponding to the attribute information of the target data field which is determined to match said predetermined condition.

DESCRIPTION OF THE PREFERRED EMBODIMENT

A. Hardware Configuration

Figure 1:
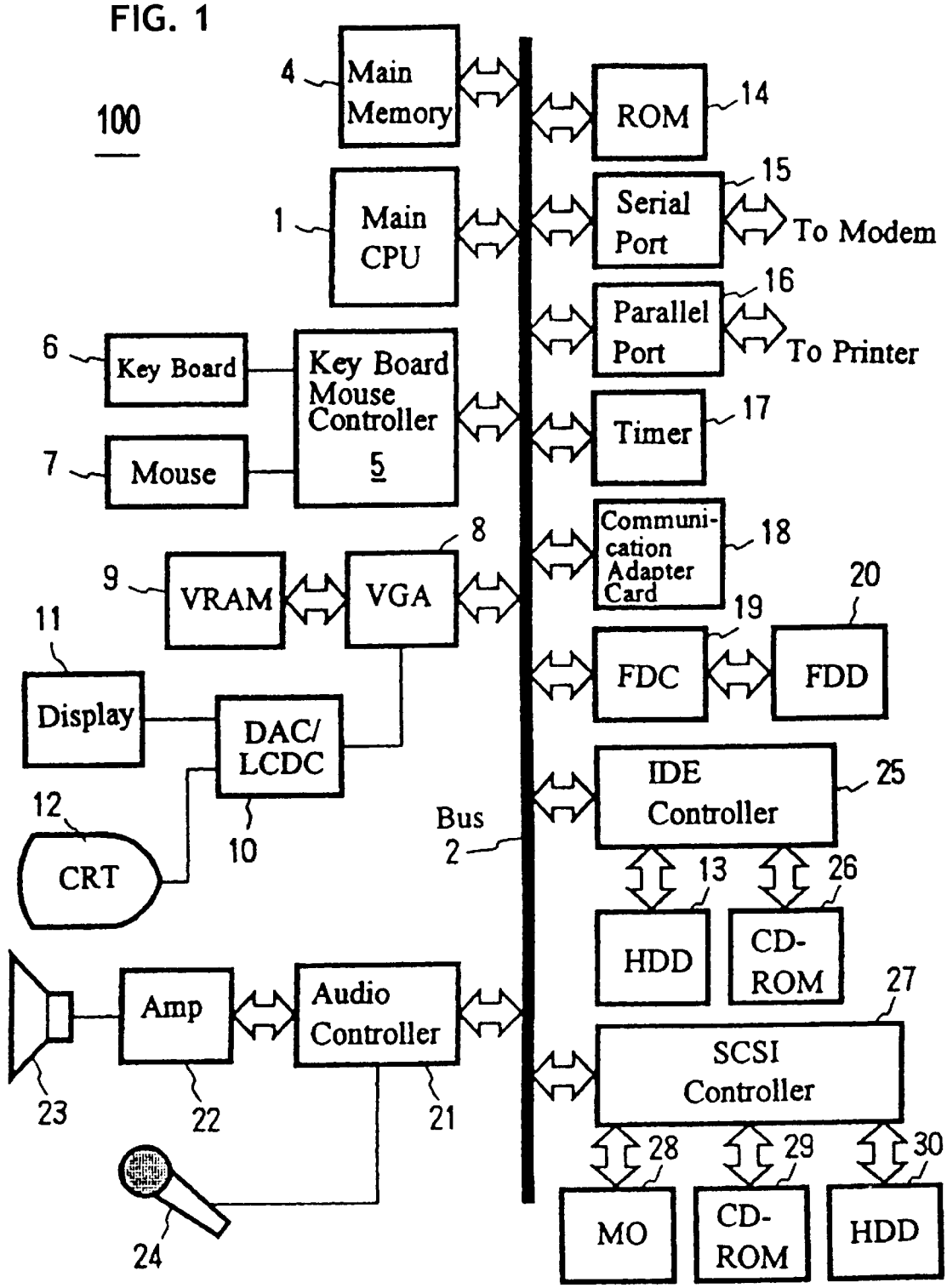
FIG. 1 is a block diagram of a hardware configuration.

An embodiment of this invention is now described hereunder with reference to the drawings. With reference to FIG. 1, a schematic diagram of a hardware configuration for practicing the image processing system of this invention is shown. The database retrieval system 100 comprises a central processing unit (CPU) and a memory 4. The CPU 1 and the memory 4 are connected to a hard disk drive 13, 31 which is an auxiliary storage device through a bus 2. A floppy disk device (or a recording medium drive such as an MO and CD-ROM 13, 26, 28, 29, 30) 20 is connected to the bus 2 via a floppy disk controller 19 (or various controllers such as an IDE controller 25, and a SCSI controller 27, etc.).

A floppy disk (or a recording medium such as an MO and a CD-ROM, etc.) is inserted to the floppy disk device (or a recording medium drive 26, 28, 29 such as an MO and CD-ROM) 20. Computer program codes which give instructions in co-operation with an operating system to practice this invention may be recorded in such floppy disk, the hard disk device 13, 30, or the ROM 14 and executed by being stored in the memory 4. The computer program codes may be recorded in a plurality of media by being compressed or divided in to a plurality of pieces.

In addition, the database retrieval system 100 may be a system which is provided with a user interface hardware including a pointing device (a mouse, a joystick, a track ball, etc.) 7 for inputting screen position information, a keyboard 6 for supporting a key input and a display 11, 12 for presenting image data to the user. A speaker 23 receives an audio signal from an audio controller 21 through an amplifier 22 for output as a voice.

The database which is an input to the database retrieval system 100 of this invention is stored in the hard disk 30 and inputted to the database retrieval system 100 via the SCSI interface 27. It is also possible to communicate with other computers and gain an access to a database of other system and a database existing in a recording such as the hard disk 24 via a serial port 15, a modem or a communication adapter 18 of a token ring, etc.

As such, it will be readily understood that this invention may be implemented in a form of a computer implemented in a conventional personal computer (PC), a workstation, and home appliances including a television set or a facsimile device or a combination thereof. It should be however understood that these components are given as an example and it is not meant that all of these components are necessarily indispensable components of this invention. In particular, the serial port 15, the communication adapter card 18, the audio controller 21, the amplifier 22, and the speaker 23 are not necessarily indispensable components in a mode of practicing this invention because this invention is intended to retrieve from a database.

The operating system may include one which supports GUI multi-window environment as a standard, such as Windows (a trademark of Microsoft), OS/2 (a trademark of IBM) and X-WINDOWS System (trademark of MIT) on AIX (trademark of IBM), without being limited to any specific operating system environment.

While a system in a stand alone environment is shown in FIG. 1, this invention may be also implemented in a form of a client/server system in which a client machine is LAN connected to a server machine by Ethernet and token ring, etc., with the server machine side provided with an internal data generating part, an internal data holding part, an internal data retrieving part and an external data source, etc., and with the client machine side provided with other functions. Placement of various functions in the server machine side and the client machine side may be modified as needed as a matter of design and various modifications including combination of a plurality of machines and allocation of functions to them for practicing this invention are within the concept of this invention.

B. System Configuration

Next, the system configuration of this invention will now be described with reference to the block diagram of FIG. 2. In the preferred embodiment of this invention, the data retrieval system 200 comprises an external data source (database) 201, a window system 203, a window message handler 205, a retrieval part 207, a condition setting part 209, a control part 220, a database query statement preparing subsystem 210, an internal data generating part 211, an internal data holding part 213, and an internal data retrieval part 215.

The window system 203 receives an input of start/end of processing, an input of a coordinate position on the screen of a pointing device, and dragging of a mouse pointer for generating a window message. The window message handler 205 receives the window message generated by the window system 203 and determines to which functional block of the database retrieval part 210 this window message is delivered.

The control part 220 controls the retrieval part 207, the condition setting part 209 and the database retrieval statement preparing subsystem 210, etc. The retrieval part 207 executes a database query statement obtained from the database retrieval statement preparing subsystem 210 and the condition setting part 209. The condition setting part 209 controls a retrieval condition other than a joining condition.

Figure 3:
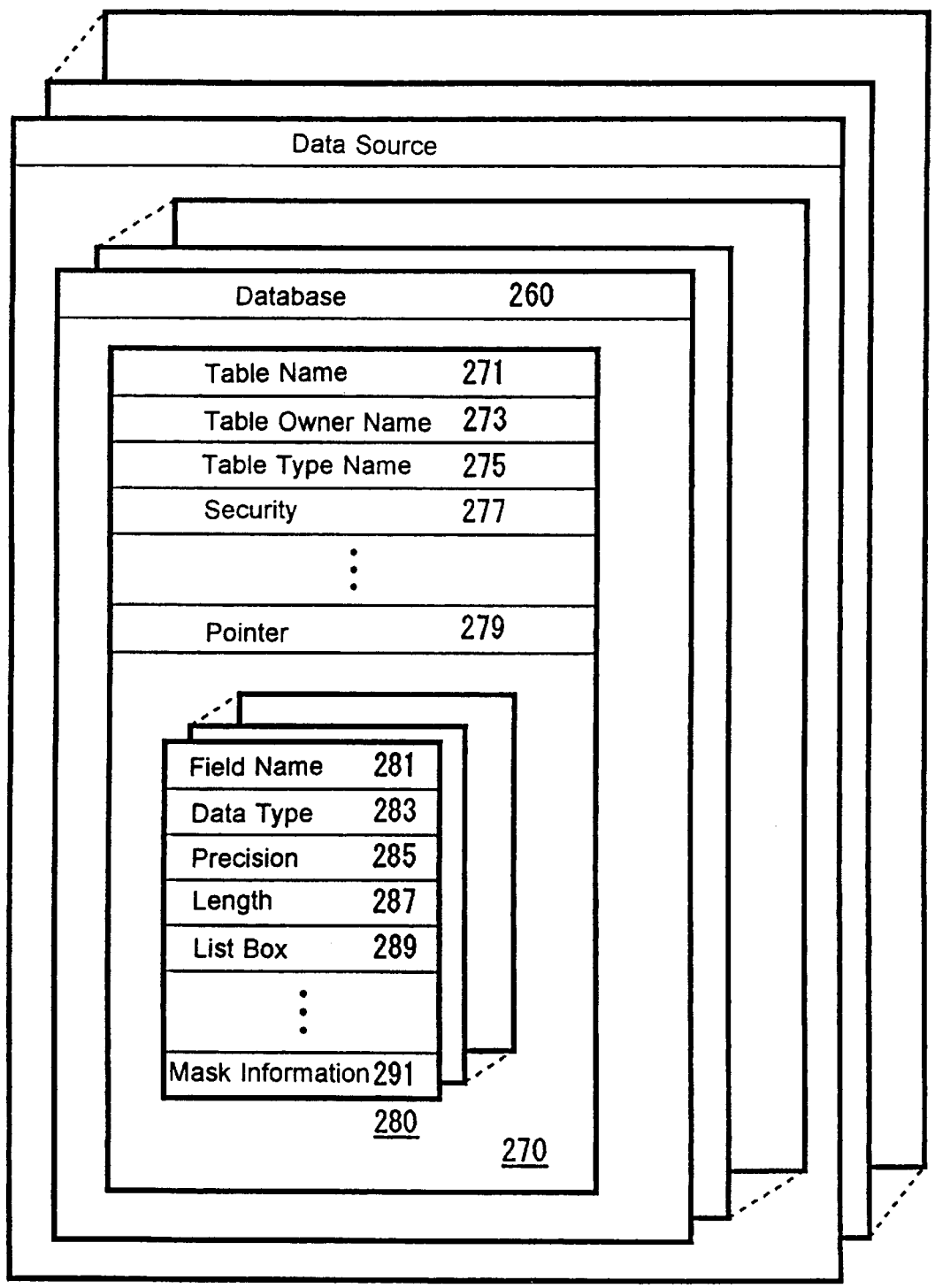
FIG. 3 is a schematic diagram of data source summary information stored in the internal data holding part in the preferred embodiment of this invention.

The internal data generating part 211 extracts information needed for this invention from a table of the database upon start of the system and stores it in the internal data holding part 213. FIG. 3 is a chart showing information (data source summary information) stored in the internal data holding part 213 in the preferred embodiment of this invention.

The data source summary information 250 in the preferred embodiment of this invention is controlled by a hierarchy of a data source, a database and a table, etc. As shown in the figure, the table summary information 270 of the data source summary information 250 in the preferred embodiment of this invention includes a table name 271 for specifying a table, a table owner name 273 specifying the author of the table, a table type 275 indicating the distinction of table and view, security information 277 for controlling an access authorization to the table and a pointer 279 to each field.

In addition, a field name 281 for specifying a field, a data type 283 for specifying the data type of the field, a precision 285 indicating down to which digit of the fraction the digits of the field are significant, a length 287 indicating the data length, a list box ID specifying a displayed list box and data type compatibility mask information 291 to be described later are controlled in correspondence to each field.

The internal data retrieval part 215 extracts necessary information from the data source summary information 250 which is controlled by the internal data holding part. The condition setting part 209 converts a user input which specifies a field to be displayed and sets a condition other than joining, such as a Sort condition to a query statement. The retrieval part 207 receives a query statement from the condition setting part 209 and a joining result holding part 217 of the query statement preparing subsystem 210 to be described later, prepares a query statement by joining it, retrieves from the external data source and generates data for displaying the result.

In the preferred embodiment of this invention, the database query statement preparing subsystem 210 comprises a joining result holding part 217, a display data generating part 219, a list box display part 221 of a source database table, a list box calculating part 223 of a source database table, a list box calculating part 225 of a target database table, a list box display part 227 of a target database table, a join operation manager 229 and a control data holding part 231.

A display data generating part 219 receives information of a table specified by a user for joining via the window system 203 and the window message handler 205 and requests the internal data retrieval part 215 to extract information of the table. The extracted result is converted to a form of display data and held in the list box display part 221 of the source database table and the list box display part 227 of the target database table. The data is converted by the window system 203 for display in the display of a computer.

The list box control part 223 of the source database table and the list box control part 225 of the target database table control various operations performed on the window displayed in the list box.

The control data holding part 231 holds various control information. When processing in the list box control part 223 ends and joining is correctly done, the join operation manager 229 displays a screen prompting the user to input a join condition ("=" means join while "≠" means not join) and generates a query statement (join condition portion) based on the inputted information. The generated query statement is held in the join result holding part 217. Detailed functions and operations of the above described functional blocks will be described later in detail.

Figure 2B:
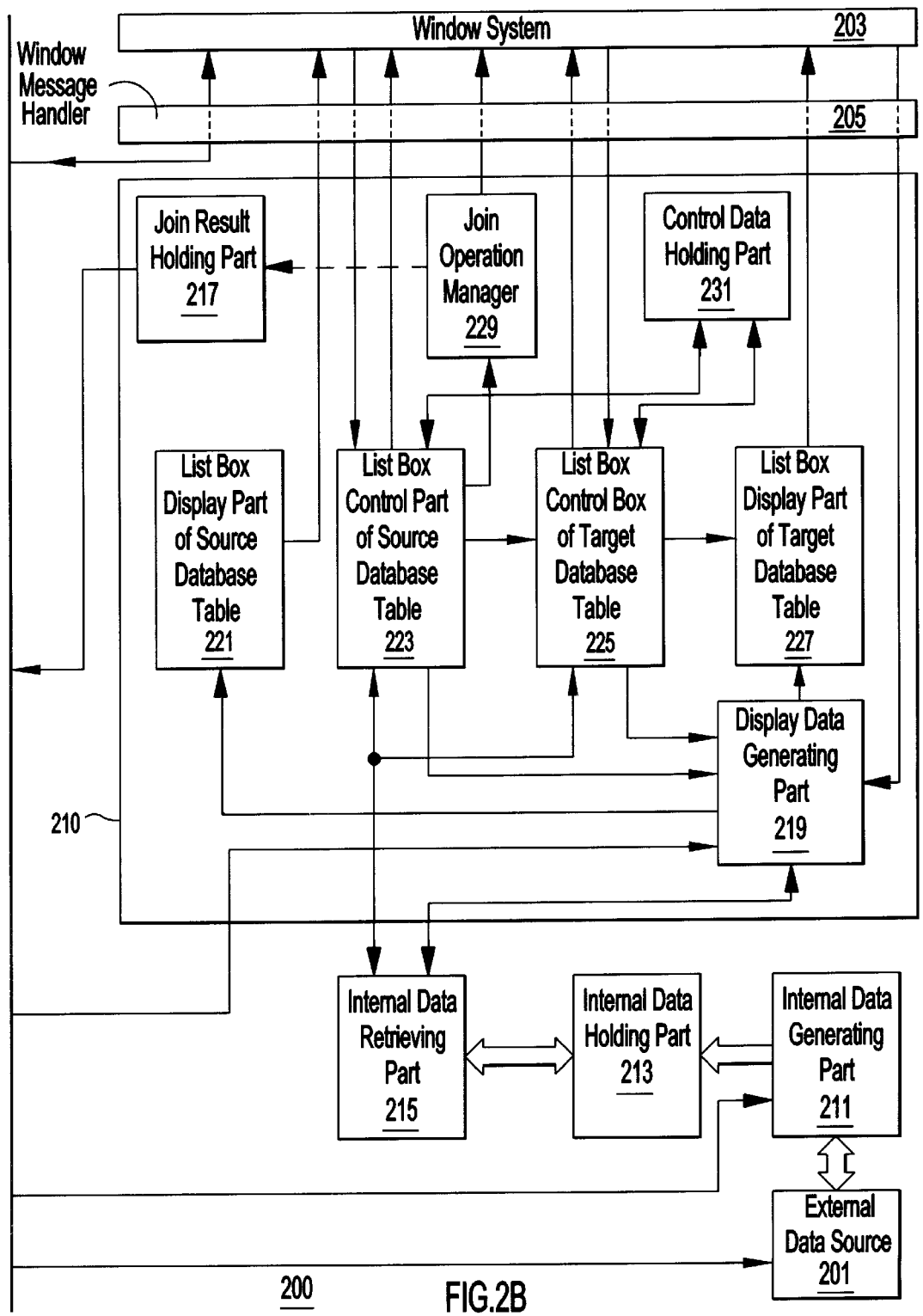
FIG. 2 is a block diagram of processing components.

While each functional block shown in FIG. 2 has been described, these functional blocks are logical functional blocks and it is not meant that each of them is implemented in the form of an independent hardware or software. They may be implemented by a composite or a shred hardware or software.

C. Description of Operation

A procedure of the database query statement preparing method in the preferred embodiment of this invention is described hereunder with reference to a flow chart.

C-1. Generation of List Box

Figure 4:
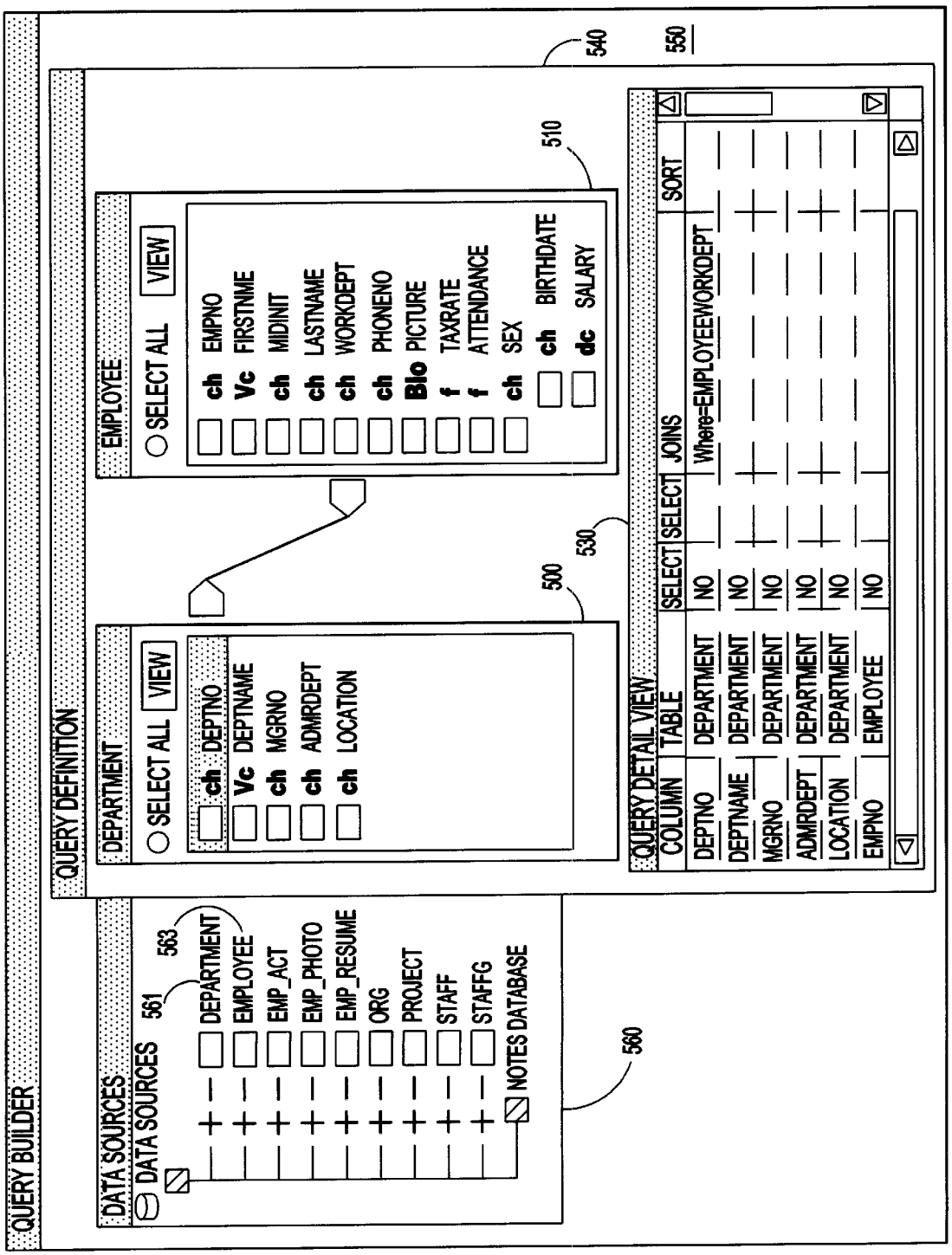
FIG. 4 is a chart showing a GUI of the database query statement preparing method in the preferred embodiment of this invention.

A list box is generated as a pre-processing of the procedure of the database query statement preparing method of this invention. FIG. 4 is a chart showing a GUI of the database query statement preparing method in the preferred embodiment of this invention while FIG. 5 shows a generation procedure in the preferred embodiment of this invention.

Figure 5:
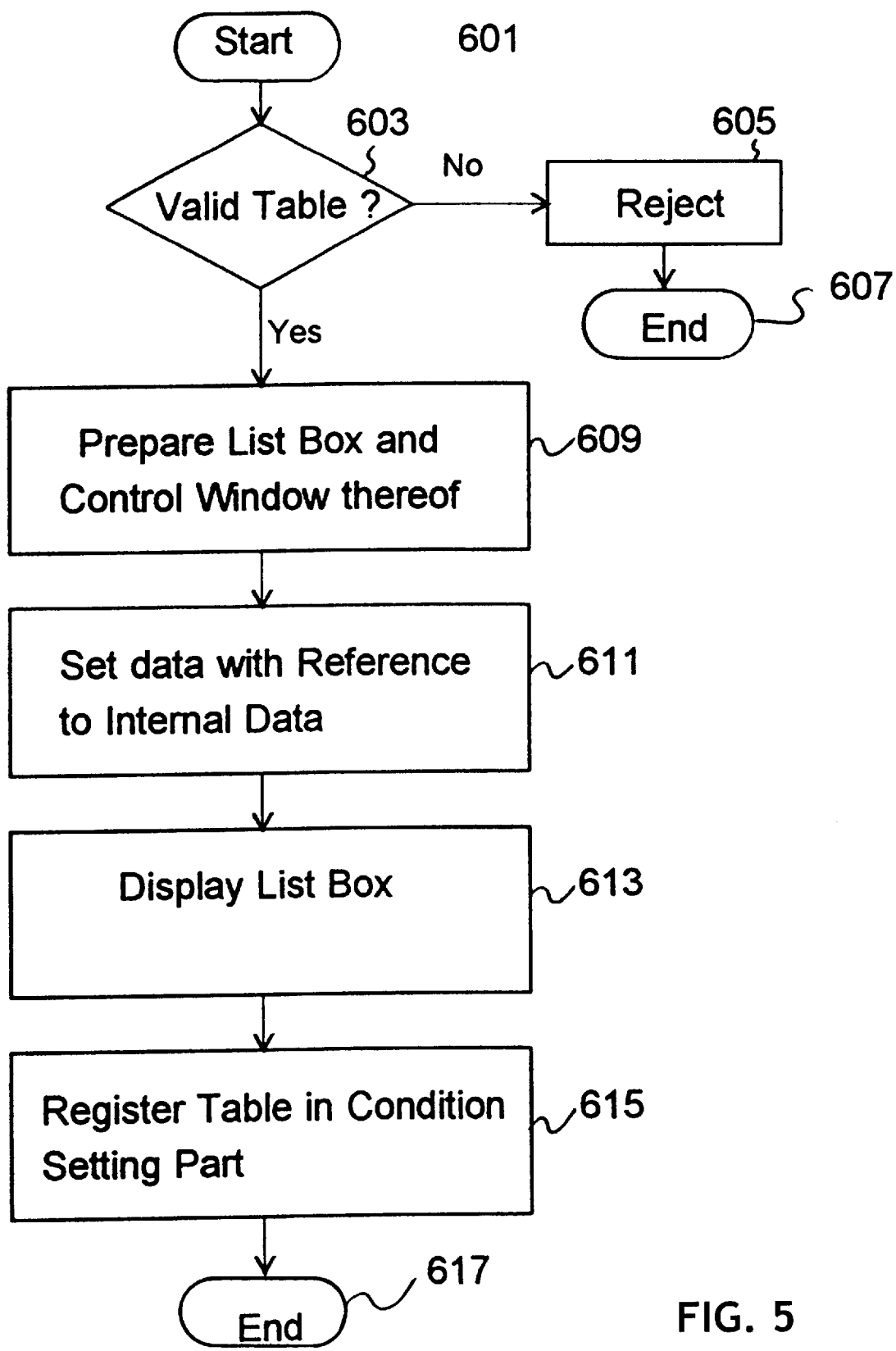
FIG. 5 is a flow chart showing a procedure of generating a list box in the preferred embodiment of this invention.

The procedure starts by dropping a table icon of the data source window 560 shown in FIG. 4 in the database query statement definition window 540 (FIG. 5, block 601). This figure shows the state in which a DEPARTMENT table 561 and an EMPLOYEE table 563 are dropped in the database query statement definition window 540.

When the table icon of the data source window 560 is dropped in the database query statement definition window 540, it is first of all determined to see whether or not the table is valid (block 603). Specifically, this is determined by examining whether or not the table is valid and same as a table which has been already dropped.

When it is determined that the table is not valid, reject processing is performed (block 605) and a next drop operation is waited (block 607). On the other hand, when it is determined that the table is valid, list boxes 500, 510 and the control window 630 thereof are generated (block 609).

Specifically, the control part 220 generates list box control parts 223, 225 of a source (or target) database table and list box control parts 221, 227 of a target (or source) database table and instructs the display data generating part to generate list boxes 500, 510 and a window 630 controlling them.

Next, the display screen generating part 219 instructs the internal data retrieving part 215 to extract information necessary for display from the internal data holding part using the table name delivered from the control part 220 as a key. The internal data retrieving part 215 delivers the extracted information to the display data generating part (block 611). The display data generating part displays the list boxes 500, 510 based on the delivered information (block 613). The information of the dropped table is also delivered to the condition setting part 209 (block 615). After these steps are completed, the system waits for further user input (block 617).

C-2. Start of Drag Operation

Figure 6:
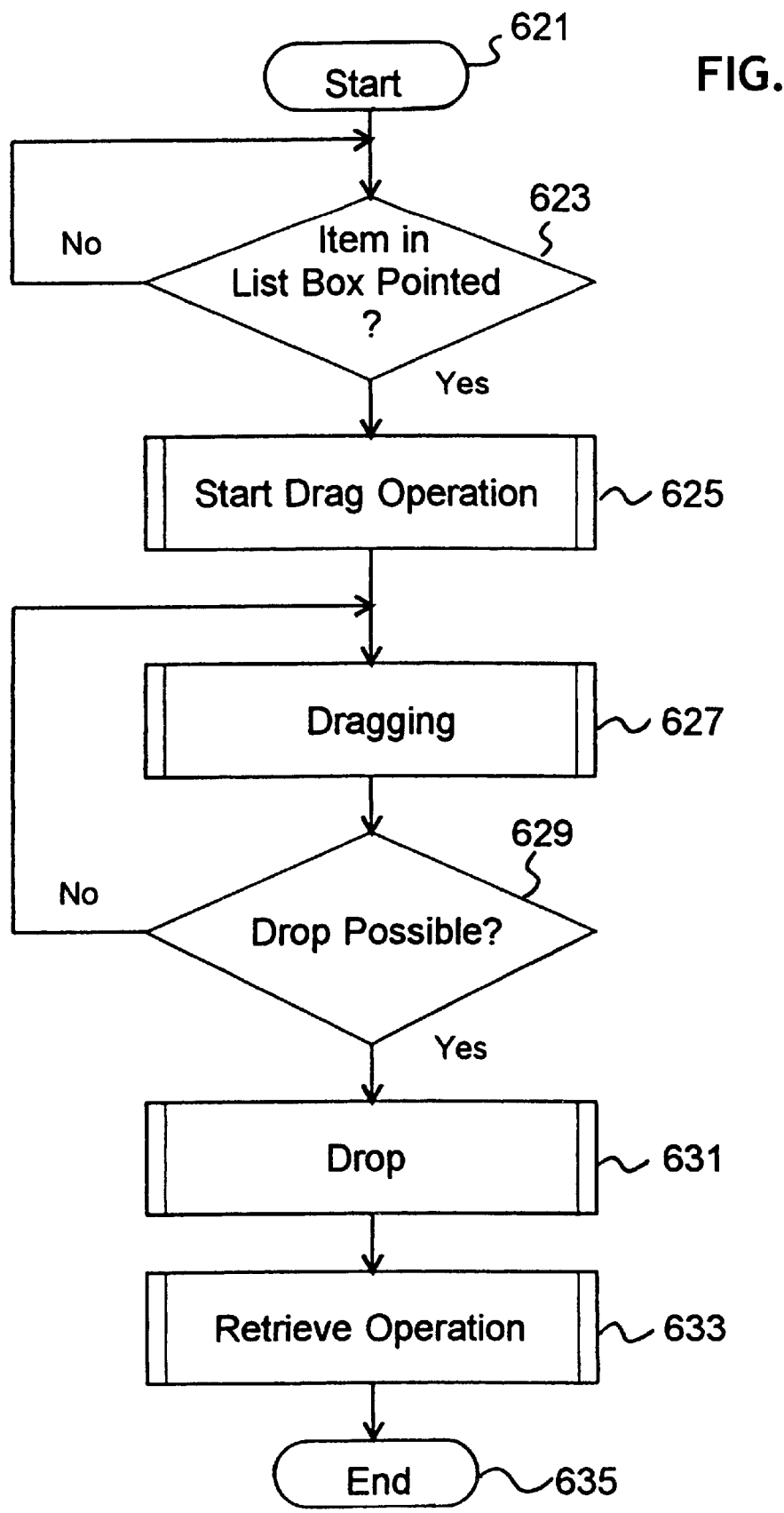
FIG. 6 is a flow chart showing a procedure of preparing a database query statement in the preferred embodiment of this invention.
Figure 7:
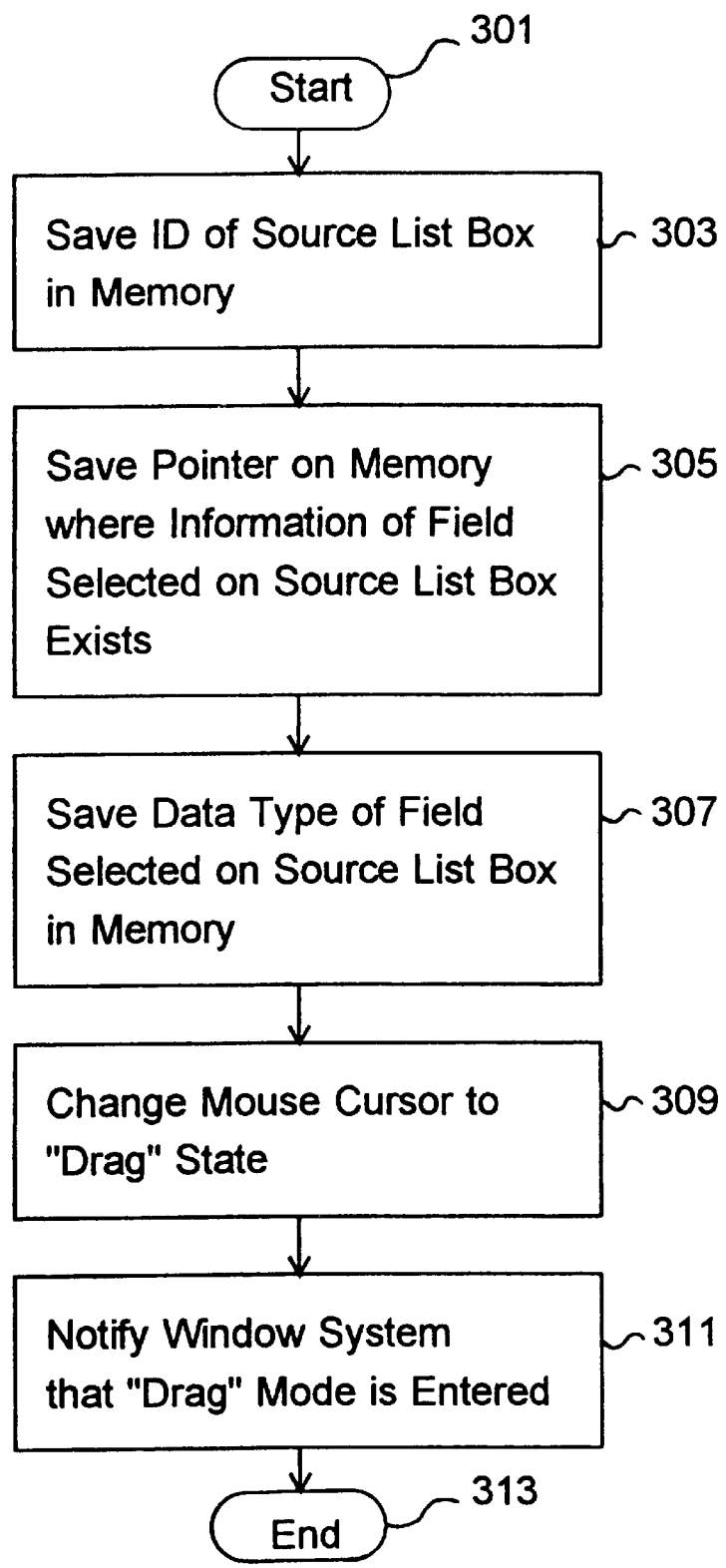
FIG. 7 is a flow chart showing an operational procedure of a database query statement preparing subsystem upon starting a drag operation in the preferred embodiment of this invention.

When an item of the list box is pointed by a pointing device after the list box is generated (FIG. 6, block 623), it is determined that a drag operation starts. In the example of FIG. 4, a department name 501 is pointed. FIG. 7 is a flow chart showing an operational procedure of the database query statement preparing subsystem in the preferred embodiment of this invention at the time when the drag operation starts.

First, the ID of the source list box 500 is held in a control data holding part 231 (block 303). The ID of the source list box 500 is allocated by the control part 220 upon generation of the list box and the value of the ID is held in both the control data holding part 231 and the internal data holding part 213 (list box 289 in FIG. 3).

Next, in order to assure an access to the information of a selected field of a table corresponding to the source list box, a pointer which has information of the selected field (item) on the source list box is acquired from the internal data holding part 213 (pointer information 279 of FIG. 3) and held in the control data holding part 231 (block 305).

The data type 283 of the field selected on the source list box and data type compatibility mask information 291 are extracted from the internal data holding part and held in the control data holding part 231 (block 307). Because an access to the data type 283 of the selected field and the data type compatibility mask information 291 becomes available from the control data holding part 231, a higher speed of operation is obtained than an accessing to the internal data holding part 213 based on the pointer information.

Next, the list box control part 223 of the source requests the window system 203 to change the mouse cursor to a drag state (block 309). By this, the user can instantly understand visually that dragging is currently in operation. Also, the window system 203 is notified that a drag mode is entered (block 311). By this, the processing procedure during dragging is entered (FIG. 6, block 627).

C-3. Processing during Dragging

Figure 8:
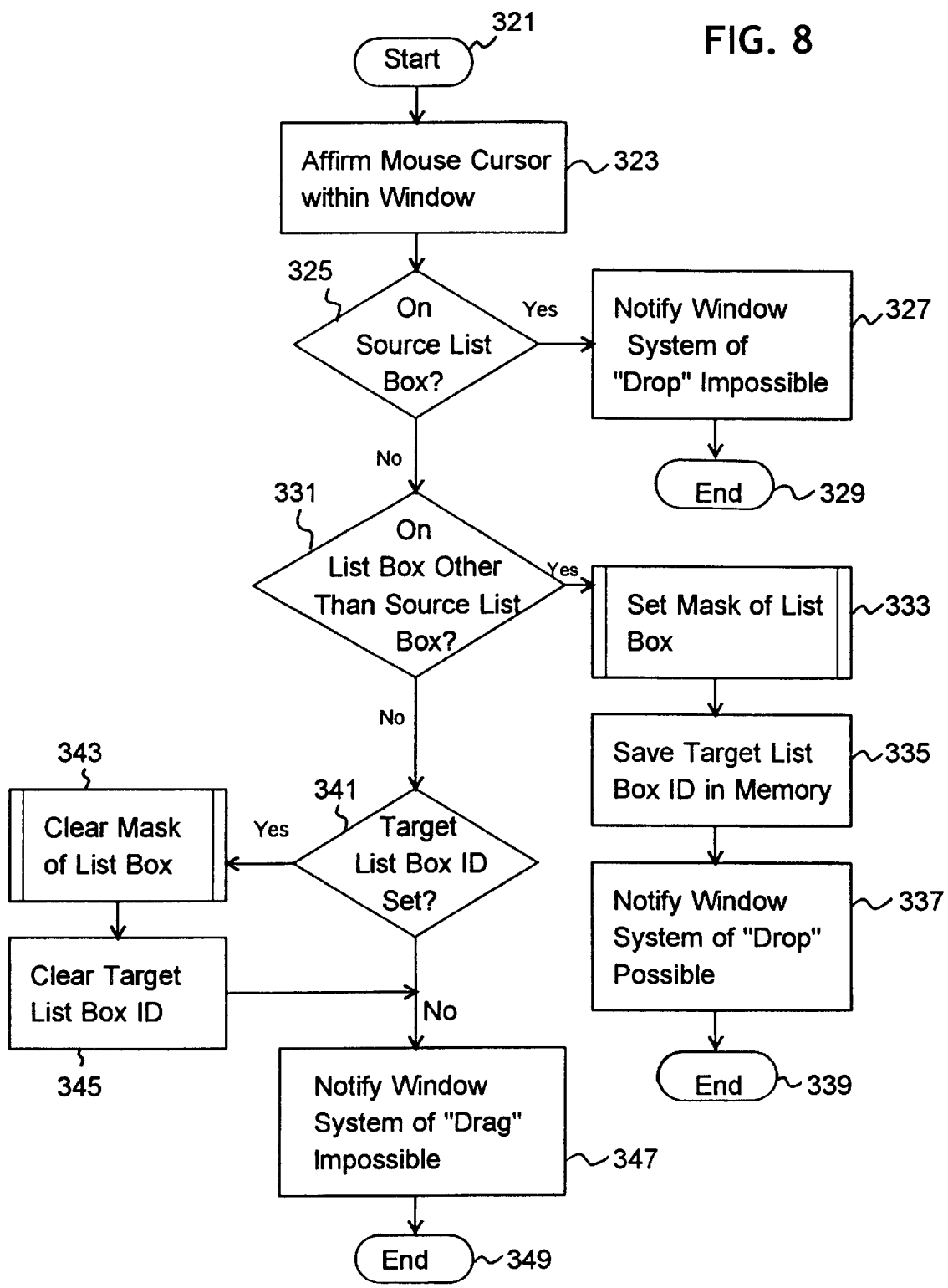
FIG. 8 is a flow chart showing an operational procedure of a database query statement preparing subsystem during a drag operation in the preferred embodiment of this invention.

FIG. 8 is a flow chart showing the processing procedure during dragging. The window system 203 and the message handler 205 determine the position of the mouse cursor (block 323) and, when it is determined that the mouse cursor is on the source list box (block 325), notify the window system that dropping is impossible (block 327).

When the mouse cursor is on a list box other than the source list box (block 331), a mask of the list box is set (block 333).

Figure 9:
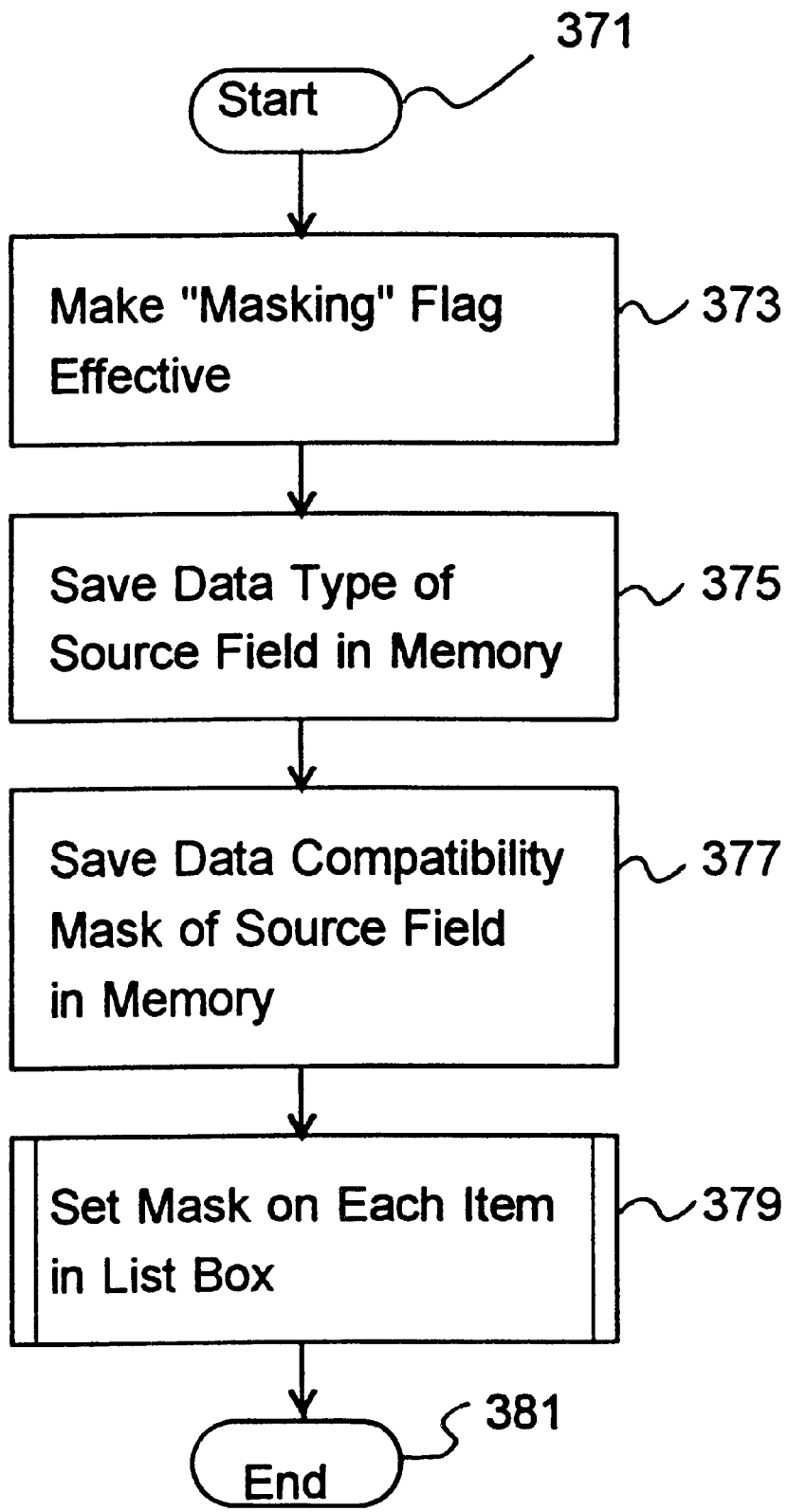
FIG. 9 is a flow chart showing a procedure of mask set in the preferred embodiment of this invention.

FIG. 9 is a flow chart showing a processing procedure of mask setting. When the processing procedure of mask setting is entered, a target list box control part 223 makes a mask flag effective at first (block 373). The mask flag is a flag for indicating which of set mask and clear mask to be described later is effected. The value of this flag is held in the control data holding part 231.

Next, the target list box control part 223 acquires the data type and the data compatibility mask of the source field from the control data holding part 231 (blocks 375, 377). The target list box control part 223 then performs masking processing of each item in the target list box using the acquired data compatibility mask (block 379).

Figure 11:
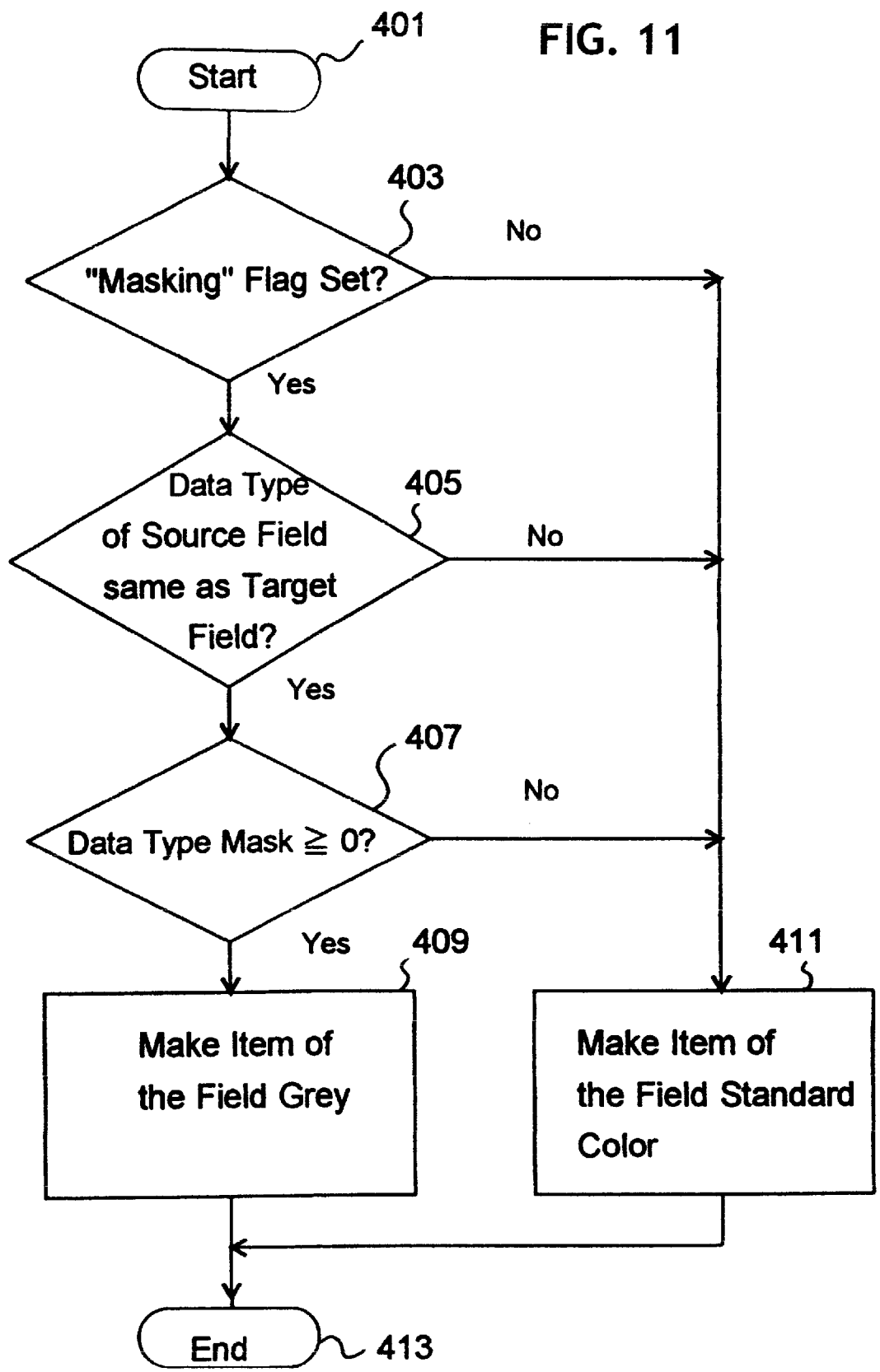
FIG. 11 is a flow chart showing a procedure of masking each item in the target list box in the preferred embodiment of this invention.

FIG. 11 is a flow chart showing a procedure of masking each item in the target list box. The target list box control part 223 determines whether or not the mask flag is set (block 403), whether or not the data types of the source field and the target field are same (block 405), and whether or not the data type mask is equal to or greater than 0 (block 407).

When all criteria are met, the target field are determined to be a field which can be joined and the item of that field is caused to be in a standard color (block 411). On the other hand, when any of criterion is not met, the target field are determined to be a field which can not be joined and the item of that field is caused to be in a grey color (block 409). Specifically, the target list box control part 223 requests the window system 203 to change the color property of the item.

Figure 13:
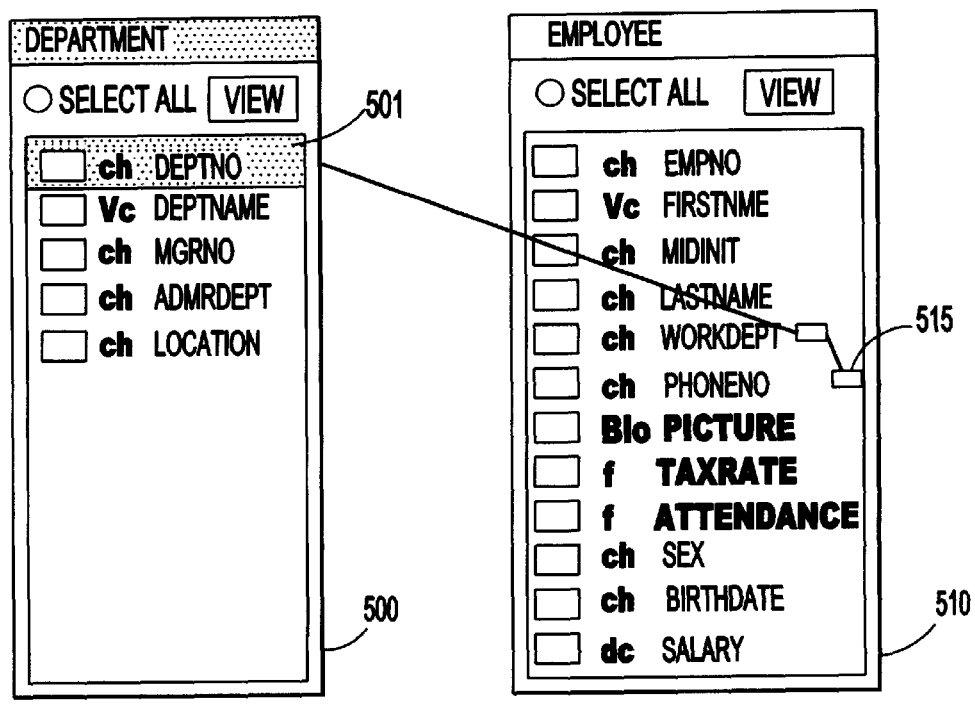
FIG. 13 is a chart showing a GUI of the database query statement preparing method in the preferred embodiment of this invention.

FIG. 13 shows a state in which a field (DEPTNO) 501 in the list box 500 of the first table (source table:DEPARTMENT) is selected and the mouse cursor is moved into the list box 510 of the second table (EMPLOYEE) while the button is held depressed.

In this example, because the data type of the selected field (DEPTNO) of the source table is of a Character type, the data item of a field of a data type which is considered to make no sense in joining with the second table is displayed in a grey color state. Namely, PICTURE, TAXRATE, ATTENDANCE which are the data items of a BLOB type field and FLOAT type field of the second table are displayed in a grey color state.

While the data item of a field which is permitted to join and the data item of a field which is not permitted to join are distinctively displayed by changing the color in the preferred embodiment of this invention, this may be done by a change of various display attributes and display contents including change of brightness and font as well as blinking, inversion, underscoring and shading added to the display in addition to the change of color.

The data type compatibility mask includes a plurality of bits as shown in the tables 1 and 2 in the preferred embodiment of this invention.

TABLE 1

| | |
|---|---|
| Data type compatibility mask of source item: | 00010000000... |
| Data type compatibility mask of target item: | 01111000110... |
| AND result: | 00010000000... |

TABLE 2

| | |
|---|---|
| Data type compatibility mask of source item: | 00010000000... |
| Data type compatibility mask of target item: | 01100110010... |
| AND result: | 00000000000... |

Each bit of data type compatibility mask is correlated to one data type in the preferred embodiment of this invention. For example, it is seen that "1" is set in the 4th bit of the data type compatibility mask of source item in the Table 1. This bit means that the source item has a data type of character.

On the other hand, the data type compatibility mask of target item has "1" set in a bit corresponding to a data type which can join. Because "1" is set in the 4th bit corresponding to character in the example of Table 1, ANDing this (data type mask) results in "1" set in the 4th bit.

In the example of the Table 2, because the target item is of a data type which can not join the character type, the 4th bit of the data type compatibility mask is set to "0". Therefore, ANDing this results in a bit string of all zero.

Returning to FIG. 8 again, after the mask set of the list box is completed in block 333, the list box ID of the target is held in the control data holding part 231 (block 335) and the window system is notified that dropping is impossible (block 337). The list box ID is held in the control data holding part 231 for determining whether or not to clear the mask of the list box.

When the mouse cursor is in a position other than the list box, it is determined whether or not the target list box ID is set (block 341). The case where the target list box ID is not set is a state in which the mouse cursor dragged from the source list box has not arrived at any other list box so that the window system 203 is notified that dropping is impossible (block 347).

When the target list box ID is set, it is considered that the mouse cursor once entered the target list box and then moved out of the list box again so that the mask of the target list box is cleared (block 343).

Figure 10:
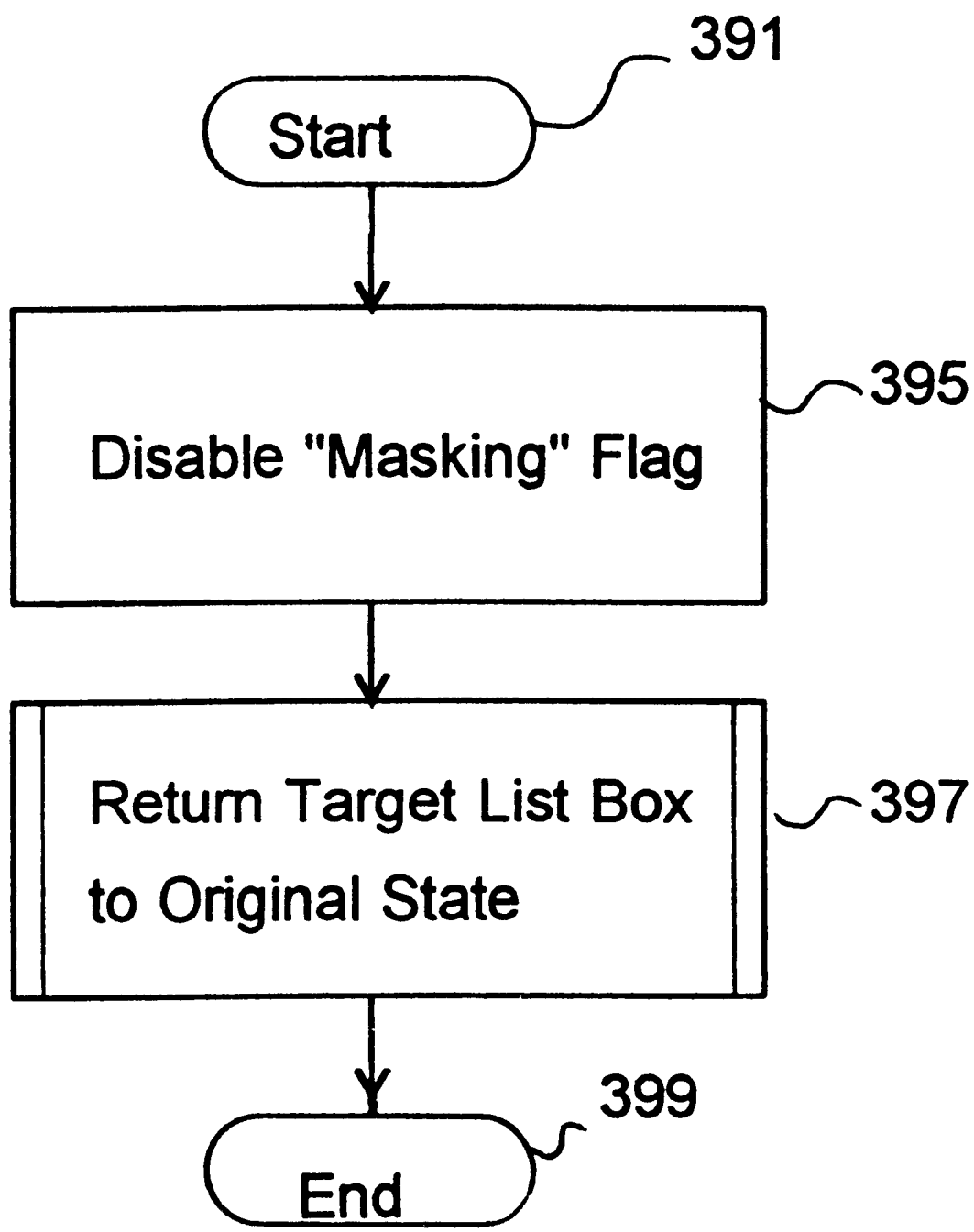
FIG. 10 is a flow chart showing a procedure of mask clear in the preferred embodiment of this invention.

FIG. 10 is a flow chart showing a processing procedure of clearing the mask. In this procedure, the flag to be masked is disabled at first (block 395) and the target list box is returned to the original state (block 397).

In the preferred embodiment of this invention, the process of returning the target list box to the original state uses the processing procedure of masking each item in the target list box of FIG. 11, provided that "No" decision is made in the block 403 because the flag to be masked is disabled in the block 395. Thus the color of the item which was once changed to grey is returned to the standard color.

Thereafter, the procedure returns to FIG. 8 again and clears the target list box ID after the process of clearing the mask of the list box (block 345).

C-4. Drop Processing

In the flow chart of FIG. 8 showing the procedure during dragging, the procedure moves to dropping process (FIG. 6, blocks 629, 631) when the window system is notified that dropping is possible (block 337).

Figure 12:
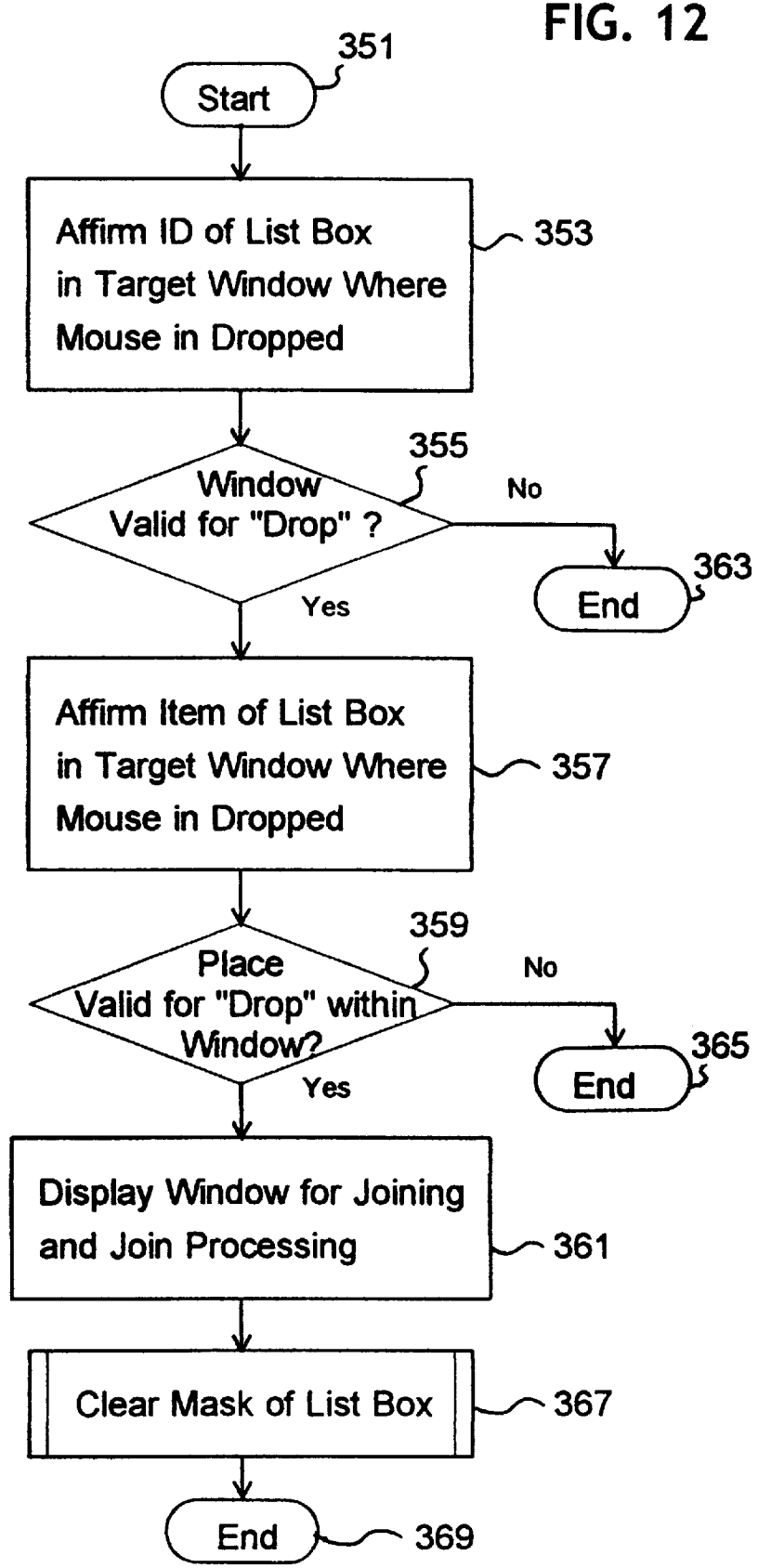
FIG. 12 is a flow chart showing an operational procedure of a database query statement preparing subsystem during dropping operation in the preferred embodiment of this invention.

FIG. 12 is a flow chart showing a procedure of drop processing. In drop processing, the list box ID of the target window to be dropped is acquired and held for use in subsequent processing (block 353).

When the window is not valid for dropping (block 355), reject processing is effected and the processing ends (block 363). When the window is valid for dropping (block 355), the item of the list box in the target window to be dropped is affirmed (block 357). Specifically, the target list box control part 223 determines whether or not the mouse cursor is in the position of the item.

When it is determined that there is no place which is valid for dropping within the window (block 359), reject is effected and the processing ends (block 365). When it is determined that the place is valid for dropping within the window (block 359), a window for joining (FIG. 4, window 530) is displayed and join processing is effected (block 361). In other words, by delivering information of the source field and information of the target field to the join operation manager 229, a database query statement (join portion) is generated and is stored in the join result holding part 217.

Figure 14:
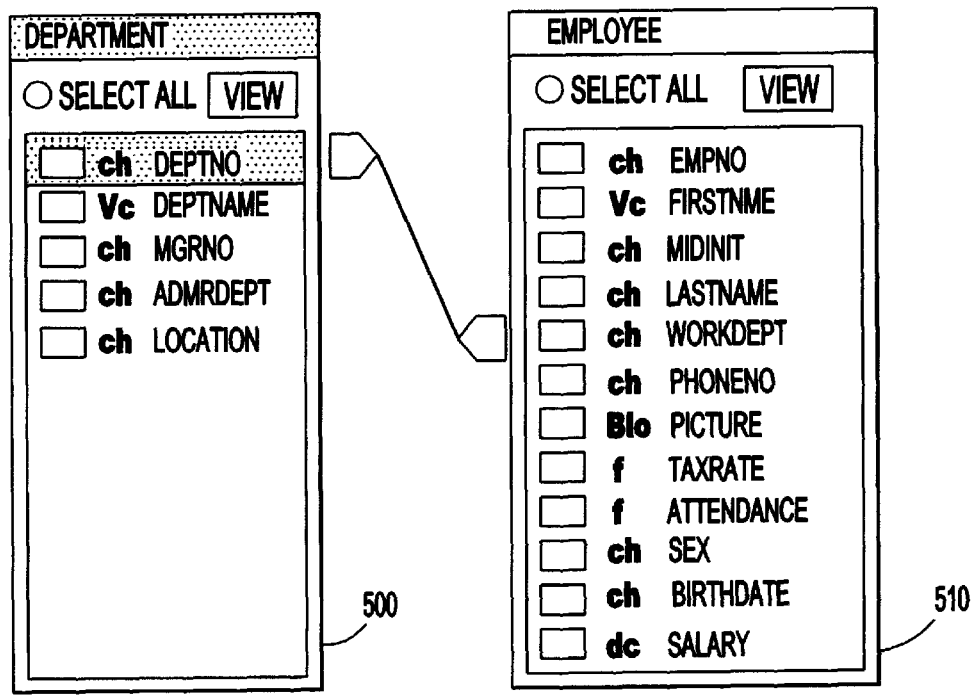
FIG. 14 is a chart showing a GUI of the database query statement preparing method in the preferred embodiment of this invention.
Figure 15:
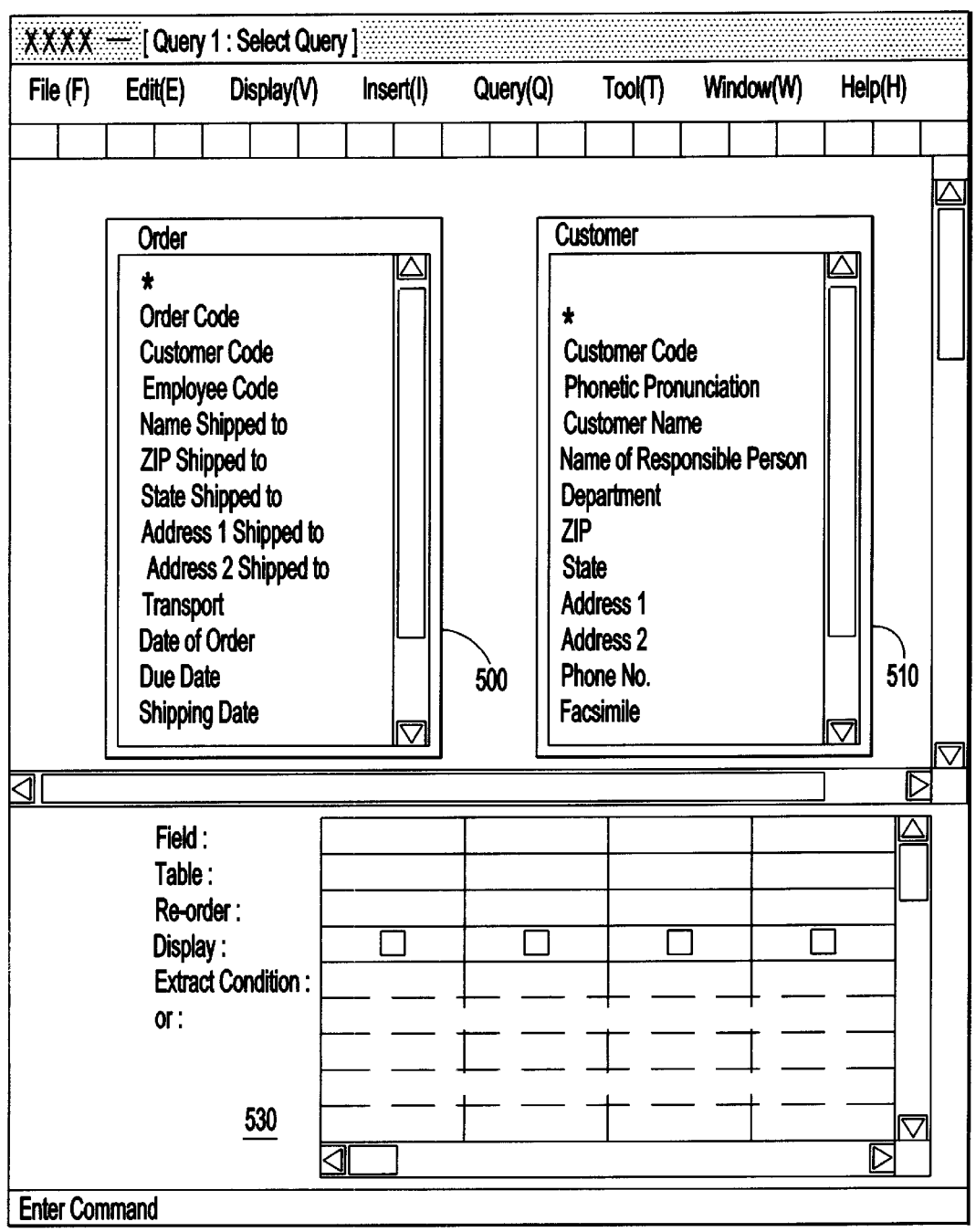
FIG. 15 is a chart showing a GUI of a database query statement preparing method in prior art.
Figure 16:
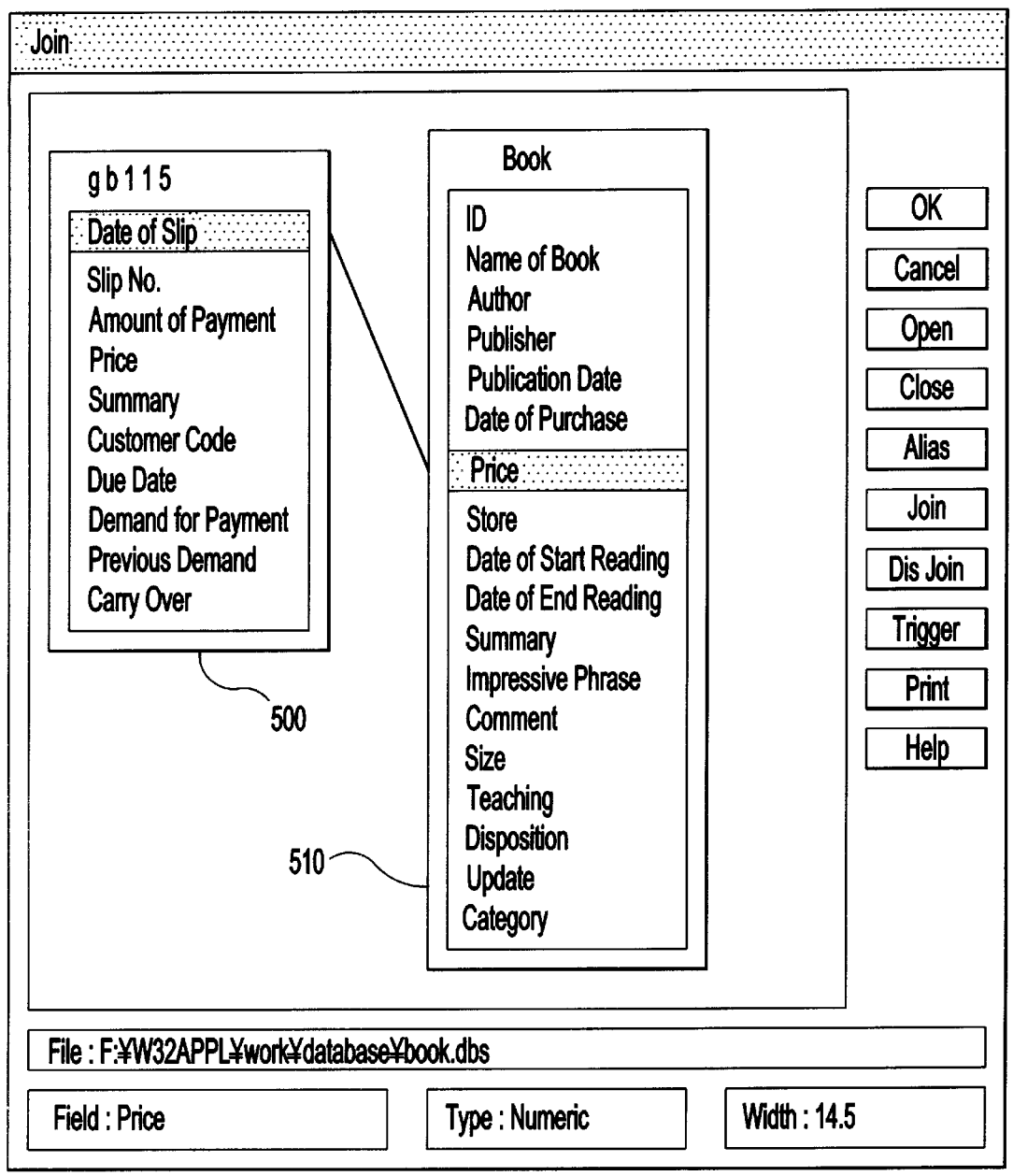
FIG. 16 is a chart showing a GUI of a database query statement preparing method in prior art.

Then, in order to return the changed color of the target list box to the original color, the list box mask is cleared (FIG. 10, block 367). FIG. 14 shows a screen in which a joining operation is actually completed and it is seen that the field which was displayed in the second grey color state returns to the normal display state.

The statement stored in the join result holding part 217 is utilized for a conventional database retrieval processing (FIG. 6, block 633).

As described in the above, a database query statement including joining of a plurality of tables can be prepared visually and efficiently without an error according to this invention.

What is claimed is:

1. A computer assisted method of forming a database query statement, the query statement including a joining of a source data table having a plurality of source data fields represented by corresponding source data field names with a target data table having a plurality of target data fields represented by corresponding target data field names, comprising the steps of:

displaying a source list box containing a list of at least some of said source data field names and a target list box containing a list of at least some of said target data field names;

pointing by an operator to a source data field name displayed in the source list box to select the corresponding source data field of the source data table for possible joining;

automatically determining which of the target data fields having corresponding target data field names displayed in the target list box cannot be joined with the selected source data field of the source data table;

automatically indicating the target data field names of target data fields which cannot be properly joined with the selected source data field by distinctly displaying said indicated target data field names differently in the target list box than the target data field names of target data fields which can be joined with the selected source data field, whereby the operator may select from among the target data field names in the target list box that are not distinctively displayed to select a proper target data field for joining with the selected source data field in forming a query statement.

2. Apparatus for assisting an operator in forming a database query statement, the query statement including a joining of a source data table having a plurality of source data fields represented by corresponding source data field names with a target data table having a plurality of target data fields represented by corresponding target data field names, comprising:

a display for displaying a source list box containing a list of at least some of said source data field names and a target list box containing a list of at least some of said target data field names;

a pointing device for pointing by the operator to a source data field name displayed in the source list box to select the corresponding source data field of the source data table for possible joining;

a target list box control for automatically determining which of the target data fields having corresponding target data field names displayed in the target list box cannot be joined with the selected source data field of the source data table;

said target list box control automatically controlling said display to indicate the target data field names of target data fields which cannot be properly joined with the selected source data field by distinctly displaying said indicated target data field names differently in the target list box than the target data field names of target data fields which can be joined with the selected source data field, whereby the operator may select from among the target data field names in the target list box that are not distinctively displayed to select a proper target data field for joining with the selected source data field in forming a query statement.

3. A recording medium storing a program for computer assisting an operator in forming a database query statement, the query statement including a joining of a source data table having a plurality of source data fields represented by corresponding source data field names with a target data table having a plurality of target data fields represented by corresponding target data field names, said program comprising:

program code for displaying a source list box containing a list of at least some of said source data field names and a target list box containing a list of at least some of said target data field names;

program code for allowing an operator to point to a source data field name displayed in the source list box to select the corresponding source data field of the source data table for possible joining;

program code for automatically determining which of the target data fields having corresponding target data field names displayed in the target list box cannot be joined with the selected source data field of the source data table;

program code for automatically indicating the target data field names of target data fields which cannot be properly joined with the selected source data field by distinctly displaying said indicated target data field names differently in the target list box than the target data field names of target data fields which can be joined with the selected source data field, whereby the operator may select from among the target data field names in the target list box that are not distinctively displayed to select a proper target data field for joining with the selected source data field in forming a query statement.

* * * * *